United States Patent [19]

Delzer et al.

[11] Patent Number: 5,370,848

[45] Date of Patent: Dec. 6, 1994

[54] SULFUR ABSORBENTS

[75] Inventors: Gary A. Delzer; Randall A. Porter, both of Bartlesville, Okla.

[73] Assignee: Phillips Petroleum Company, Bartlesville, Okla.

[21] Appl. No.: 718,054

[22] Filed: Jun. 20, 1991

[51] Int. Cl.$^5$ ............................................. C01B 17/16
[52] U.S. Cl. .................................. 423/220; 423/230; 423/244.06; 423/573.1; 423/574.1; 423/576
[58] Field of Search ................ 423/576, 574 R, 573.1, 423/230, 220, 244.06, 574.1

[56] References Cited

U.S. PATENT DOCUMENTS

| | | | |
|---|---|---|---|
| 3,848,071 | 11/1974 | Groenedaal | 423/574 |
| 4,044,114 | 8/1977 | Dezael et al. | 423/574 R |
| 4,085,199 | 4/1978 | Singleton et al. | 423/574 R |
| 4,088,736 | 5/1978 | Courty et al. | 423/230 |
| 4,241,032 | 12/1980 | Werner et al. | 423/226 |
| 4,533,529 | 8/1985 | Lee | 423/230 |
| 4,797,268 | 1/1989 | McGovern et al. | 423/574 R |
| 4,842,843 | 6/1989 | Pendergraft | 423/574 R |

Primary Examiner—Gary P. Straub
Assistant Examiner—Timothy C. Vanoy
Attorney, Agent, or Firm—Charles W. Stewart

[57] ABSTRACT

Provided is an improved process for removing sulfur compounds from sulfur contaminated fluid streams by contacting such fluid streams with an absorbent composition comprising zinc oxide, silica, and molybdenum disulfide. The absorbent composition comprising zinc oxide, silica, and molybdenum disulfide is a novel composition which has the desirable properties of high sulfur loading capacity and the, ability to be contacted with the hydrogen sulfide containing fluid stream for the removal of such hydrogen sulfide from said fluid stream with a minimum amount of sulfur dioxide slippage. An additional embodiment of the disclosed invention includes a method for minimizing the amount of extrusion die wear during the production of the zinc oxide based absorbent compositions. Extrusion die wear is reduced by adding a quantity of molybdenum disulfide to the zinc oxide absorbent in an amount which provides desirable lubricating properties such that extrusion die wear is reduced during the manufacture of the composition.

13 Claims, 2 Drawing Sheets

SULFUR ABSORBENTS

This invention relates to sulfur absorbent compositions, the manufacture of sulfur absorbents and their use.

The removal of sulfur from fluid streams can be desirable or necessary for a variety of reasons. If the fluid stream is to be released as a waste stream, removal of sulfur from the fluid stream can be necessary to meet the sulfur emission requirements set by various air pollution control authorities. Such requirements are generally in the range of from about 10 ppm to 500 ppm of sulfur in the fluid stream. If the fluid stream is to be burned as a fuel, removal of sulfur from the fluid stream can be necessary to prevent environmental pollution. If the fluid stream is to be processed, removal of the sulfur is often necessary to prevent the poisoning of sulfur sensitive catalysts or to satisfy other process requirements.

Various absorption compositions have been used to remove sulfur from fluid streams when the sulfur is present as hydrogen sulfide. These absorption compositions can be manufactured by a variety of methods which include extrusion production techniques. A problem that is often encountered in the production of these absorption compositions is equipment wear caused by the abrasive nature of the absorption materials being manufactured. In certain attempts to produce commercial quantities of absorbent compositions, excessive equipment wear and downtime caused by the abrasive characteristics of the absorption material components have, in effect, rendered the production of such compositions commercially unviable.

A further property of which it is desirable for absorption compositions to have is the ability to absorb large quantities of sulfur. This capability to absorb large amounts or concentrations of sulfur is sometimes referred to as "sulfur loading" and is generally reported in terms of percent sulfur loading. The term "percent sulfur loading" is generally defined as the parts by weight of sulfur absorbed upon the surface or within the pores of an absorption composition per parts by weight of the total absorbent composition multiplied by a factor of 100. It is desirable to have an absorption composition with the largest possible sulfur loading capacity.

An additional property desirable for an absorption composition is the ability to be regenerable to the original absorbing composition state after the absorbing composition has become spent. An absorbing composition generally becomes spent when its sulfur loading capacity has essentially been used up. It is desirable for the absorbing composition to be able to undergo numerous regeneration cycles without losing its sulfur loading capacity and other desirable properties.

Even though many absorbing compositions can effectively absorb hydrogen sulfide from fluid streams containing hydrogen sulfide, it is not uncommon for many of these absorbing compositions to effectively oxidize significant amounts of hydrogen sulfide to sulfur dioxide when contacted with such fluid streams. The resulting sulfur dioxide is not removed from the fluid stream by the absorbent composition and thus passes through the absorbent material with the contacted fluid stream. This phenomena is sometimes called "sulfur slippage." It is desirable to have an absorption material which has a high capacity to absorb sulfur from a fluid stream and which minimizes the amount of sulfur slippage.

In some absorption compositions, the addition of a promoter compound can be used to allow for easier regeneration of the absorbing material.

It is, thus, an object of the present invention to provide an improved absorption composition having the desirable properties of high sulfur absorption capacity, the ability to be repeatedly regenerated, and that is capable of easy regeneration.

It is yet another object of the present invention to provide a method of reducing equipment wear caused by the abrasive nature of absorbent components and the production of such absorbents.

A still further object of this invention is to provide an improved process for removing sulfur from hydrogen sulfide containing fluid streams whereby sulfur slippage is minimized.

Yet another object of time present invention is to provide an improved method for removing sulfur compounds from fluid streams containing contaminating quantities of said sulfur compounds.

In accordance with this invention, there is provided an absorbent composition having lubricating properties which comprises a mixture of zinc oxide, silica, and up to about 25 parts by weight molybdenum disulfide per 100 parts by weight of the sum weight of the zinc oxide, silica, and molybdenum disulfide. This novel composition has many of the desirable physical properties for absorption compositions. Such properties include, for example, having a high sulfur loading capacity and having the ability to be easily regenerated with repeated regenerations without a significant loss in its initial properties.

In another aspect of this invention, there is provided a method of reducing sulfur slippage in an absorption process for removal of hydrogen sulfide from a fluid stream having a contaminating concentration of hydrogen sulfide which comprises the steps of adding molybdenum disulfide to a contact material comprising zinc oxide and silica to thereby produce an absorbent material suitable for use in said absorption process. The method further comprises the step of contacting the fluid stream with the absorbent composition under conditions that are suitable for removing at least a portion of the contaminating concentration of hydrogen sulfide in the fluid stream. In another embodiment of the method of reducing sulfur slippage, a sulfur contaminated fluid stream is contacted with a contact material comprising a mixture of zinc oxide, silica, and molybdenum disulfide, which has been previously calcined, to produce an effluent stream having a reduced concentration of the contaminating sulfur compounds.

In accordance with yet another aspect of this invention, there is provided a method of reducing equipment wear during the production of a zinc oxide based absorbent. This method comprises the steps of mixing molybdenum disulfide with zinc oxide and silica to form a mixture having certain desirable lubricating properties followed by adding to the mixture a suitable dilute acid to produce an extrudable paste. The extrudable paste is extruded through an extrusion die to produce an extrudate of the zinc oxide based absorbent.

In a still further aspect of this invention, there is provided a method of preparing a novel absorbent composition, which has the improved ability to minimize sulfur slippage in a process for absorbing hydrogen sulfide from a fluid stream when contacted with said fluid stream in the presence of a small amount of hydrogen. The method comprises mixing zinc oxide, silica, and up to about 25 parts by weight of molybdenum disulfide per 100 parts by weight of the sum weight of the zinc oxide silica and molybdenum disulfide to form a mixture. Following the mixing step, a suitable dilute acid is added to the mixture to form an extrudable paste followed by extruding the extrudable paste and calcination of the resultant extrudate.

Other objects, aspects and features of the present invention will be evident from the following detailed description of the invention, the claims and the drawings in which:

Figure 1A:
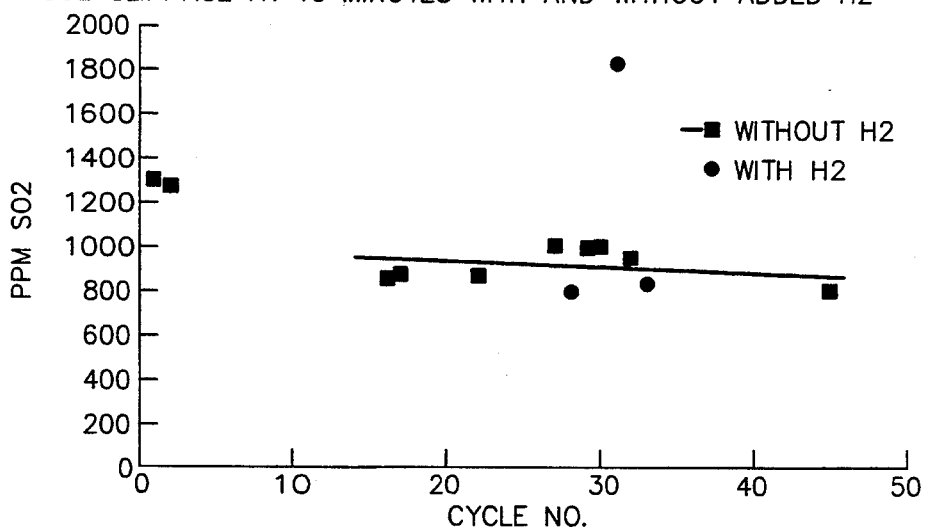
FIG. 1A–1C is a series of graphical representations of process and physical property data of a comparative absorbent composition and the use thereof.

In accordance with one aspect of the present invention, there is provided a composition comprising zinc oxide, silica, and up to about 25 parts by weight molybdenum disulfide per 100 parts by weight of the sum weight of zinc oxide, silica, and molybdenum disulfide. The composition described herein has many of the desirable physical properties for absorption compositions. When utilized in a sulfur removal process, the composition has superior sulfur loading properties and when contacted with the fluid stream containing sulfur compounds, much of the sulfur is absorbed by the composition with a minimum amount of sulfur slippage. Furthermore, by utilizing the compound molybdenum disulfide within the absorption composition, a dual benefit is provided whereby the molybdenum disulfide serves as both a promoter compound for improving the regenerability of the absorption composition and a lubricant which minimizes or reduces the amount of equipment wear when the absorbent composition is agglomerated.

One method of producing the absorbent composition is by mixing the zinc oxide, silica, and molybdenum disulfide to form a homogeneous mixture. Any suitable method for mixing the component can be used to provide the homogeneous mixture. Such suitable types of solids-mixing machines can include, but are not limited to, tumblers, stationary shells or troughs, muller mixers, which are either batch type or continuous type, impact mixers, and the like. The mixing of the solid particles components can be conducted during any suitable time period necessary to properly homogenize the mixture. Generally, however, the blending time is usually less than 60 minutes. Preferably, the mixing time will be in the range of from about 2 minutes to about 30 minutes.

Following the mixing of the absorbent components, a dilute acid is added with continued mixing in either a batch-wise fashion or continuous fashion to form an extrudable paste. Suitable types of batch mixers include, but are not limited to, change-can mixers, stationary-tank mixers, double-arm kneading mixers having any suitable type of agitator blades such as sigma blades, dispersion blades, multiwiping overlap blades, single curve blades, double-naben blades, and the like. Suitable types of continuous mixers can include, but are not limited to, single or double screw extruders, trough-and-screw mixers and pug mills. To achieve the desired dispersion of the absorption composition components, the materials are mixed until a homogenous mixture Is formed. The mixing time should be sufficient to give a uniform mixture and, generally, will be less than about 45 minutes. Preferably, the mixing time will be in the range of from about 2 minutes to about 15 minutes. The extrudable paste can then optionally be extruded, dried, and calcined to produce a composition having the desired properties of a high sulfur loading capacity and regenerability.

The absorption composition comprises any suitable mixture of silica, zinc oxide, and molybdenum disulfide which will achieve the desired absorbent properties; however, the best ratio of the components depends upon the optimization of the various physical properties desired and the economics of the given use. Generally, because of the large porous volume and great surface area of silica, it is desirable to use a certain quantity of silica in the absorption composition to impart the desirable properties of high porosity and high surface area, which accommodate the absorption of sulfur compounds. The silica is essentially inert, but when it is incorporated with the zinc oxide and molybdenum disulfide of the composition, the absorption process is facilitated. As for the incorporation of the zinc oxide component of the composition, because the zinc oxide is the active component, it is preferred to maximize the amount of this component used in the composition within the various constraints mentioned within this specification. Furthermore, it has been found that the presence of molybdenum in the absorption composition improves the regenerability of the absorbent composition and, when molybdenum disulfide is present in a mixture of the components during production, equipment wear is materially and substantially reduced due to the lubricating characteristics of molybdenum disulfide. Consequently, the use of molybdenum disulfide in the absorbent composition, both during the production of the absorbent composition and during the use of the absorbent composition, serves a dual function. It is, therefore, advantageous to use a suitable amount of molybdenum disulfide which both imparts certain desirable lubricating properties to the absorption components during manufacture of the absorbent composition and which imparts the desirable properties for enhancing absorption composition regeneration.

Any suitable concentration of zinc oxide can be used in the absorption composition which will impart the desirable absorbent properties; however, generally, the zinc oxide will be present in the absorption composition in an amount in the range of from about 10 weight percent to about 90 weight percent. Preferably, zinc oxide can be present in the range of from about 25 weight percent to about 80 weight percent. Most preferably, zinc oxide can be present in the absorption composition in the range of from about 45 weight percent to about 70 weight percent. As used herein, the term "weight percent," when referring to components of the absorption composition, is defined as parts by weight of the given component per 100 parts by weight of the total combined weight of the absorption composition multiplied by the factor 100.

The zinc oxide used in the preparation of time absorbing composition can either be in the form of zinc oxide, or in the form of one or more zinc compounds that are convertible to zinc oxide under the conditions of absorption composition preparation described herein. Examples of such zinc compounds include zinc sulfide, zinc sulfate, zinc hydroxide, zinc carbonate, zinc acetate, and zinc nitrate. Preferably, the zinc oxide is in the form of powdered zinc oxide.

Any amount of silica suitable for imparting the desired porosity can be present in the absorption composition and, generally, can be present in the absorbing composition in an amount in the range of from effective quantities up to about 90 weight percent, Preferably, silica can be present in the range of from about 30 weight percent to about 90 weight percent. Most preferably, silica can be present in the absorption composition in the range of from about 35 weight percent to about 65 weight percent.

The silica used in the preparation of the absorbing composition can be either in the form of silica, or in the form of one or more silicon compounds that are convertible to silica under the conditions of absorption composition preparation described herein. Any type of silica suitable for imparting the desired porosity can be used in the absorbing composition employed in the process of the present invention. Examples of suitable types of silica include diatomite, silica, colloid, flame-hydrolyzed silica, hydrolyzed silica, and precipitated silica, with diatomite being presently preferred. Examples of silicon compounds that are convertible to silica under the production conditions used in the preparation of the absorption composition described herein include silicic acid, sodium silicate, and ammonium silicate.

Any suitable amount of molybdenum disulfide or molybdenite, which will impart the desired lubricating properties and enhance the ease of regeneration, can be utilized in the absorbent composition. The molybdenite utilized in this invention is generally a naturally occurring compound but it can also be a synthetically produced compound. Generally, it is preferred that the molybdenite or molybdenum disulfide be present in the absorbent composition in an amount up to about 25 parts by weight molybdenum disulfide or, in the alternative, from at least a portion to about 25 parts by weight molybdenum disulfide, per 100 parts by weight of the sum weight of the zinc oxide, silica, and molybdenum disulfide. Preferably, however, the molybdenum disulfide should be present in a concentration in the range of from about 1 part by weight to about 15 parts by weight per 100 parts by weight of the total absorption composition. Most preferably, the molybdenum disulfide should be present in the range of from about 2 parts by weight to about 10 parts by weight per 100 parts by weight of the total absorption composition.

In preparing the absorption composition, if the method of agglomeration of the mixture of the components is extrusion, as opposed to alternative methods of agglomeration, a suitable acid can be used to prepare an extrudable paste. Any suitable acid can be used for forming an extrudable paste. Such suitable acids can be selected from the group consisting of nitric acid, acetic acid, sulfuric acid, hydrochloric acid, formic acid and mixtures of two or more thereof, Additionally, dilute solutions or aqueous solutions of such suitable acids can be used in the preparation of the novel composition. Generally, it is preferred to use an aqueous solution of a suitable acid in the preparation of the composition with the concentration of the acid compound generally being in the range of from about 1 weight percent to about 15 weight percent. Preferably, the concentration range will be from about 1 weight percent to about 5 weight percent. When referring herein to the weight percent concentration of an acid compound in an aqueous solution of such compound, the term shall be defined as being the ratio of the weight of such suitable acid compound to the weight of the total solution multiplied by a factor of 100.

While the preferred method for agglomerating the absorbent components is the use of extrusion techniques, any suitable method of agglomeration call be utilized to enlarge the size of the absorption material particles and to form them into relatively permanent masses having a certain desirable form such as spheroids, pills or tablets, cylinders, irregular extrusions or merely loosely bound aggregates or clusters. Examples of such methods of agglomeration include, but are not limited to, molding, tableting, pressing, pelletizing, extruding, and tumbling. When utilizing extrusion methods for agglomeration, any suitable method and extrusion equipment can be used. It is preferred to use either a single-screw extruder or a double-screw extruder which uses a screw or augur to convey a force for passing the extrusion material through a die plate to produce desirable shapes or extrusion profiles.

It is theorized that the presence of effective quantities of molybdenum disulfide in the extrudable paste provides for lubricity of the paste and lowers the coefficient of friction of the paste. Because of this increased lubricity and lowered coefficient of friction, the die wear caused by the shear forces created by the passing of the extrusion paste through the holes of the extruder die plate is materially decreased. It is desirable to provide an effective concentration of the molybdenum disulfide in the novel absorption mixture such that extrusion die wear is reduced by upwardly to about 50 percent of the die wear that would normally occur with the molybdenum disulfide not being present. Most preferably, extruder die wear will be reduced by at least 10 percent of the die wear that would normally occur with the molybdenum disulfide not being present. The die wear is determined by comparing the weight loss of an extruder die which occurs from extruding the prior art absorbent compositions to the die wear loss which results from extruding the novel composition as described herein. The percent weight loss of die wear as used herein is defined by the ratio of the difference in weight loss between that caused by the prior art compositions and that caused by the novel composition to the weight loss caused by the prior art composition multiplied by a factor of 100.

Once these absorbent components are properly mixed and agglomerated, the mixture can advantageously undergo a drying step for removing certain quantities of water. The drying of the agglomerate can be conducted at any suitable temperature for removing excess quantities of water, but preferably, the drying temperature will range from about 150° F. to about 550° F. More preferably, however, the drying temperature shall range from about 190° F. to about 480° F. Generally, the time period for such drying shall range from about 0.5 hour to about 4 hours and, more preferably, the drying time shall range from about 1 hour to about 3 hours. While the method and apparatus used for performing the optional drying step is not a critical aspect of this invention, many of the suitable methods and apparatuses for drying the agglomerate are described at length in Perry's *Chemical Engineers' Handbook*, pages 20-3 through 20-75 (6th edition, 1984).

The wet agglomerate or the optionally dried agglomerate is then calcined in the presence of an oxygen-containing fluid at a temperature suitable for achieving the desired degree of calcination. For example, generally the temperature shall range from about 700° F. to about 1400° F. More preferably, the calcination temperature shall range from about 900° F. to about 1300° F. The calcination step can be conducted for a period of time suitable for achieving the desired degree of calcination, but generally, the time for calcination shall range from about 0.5 hour to about 4 hours. Most preferably, the calcination time shall range from about 1 hour to about 3 hours to produce a calcined absorbing composition.

In a preferred embodiment of the invention, a method of reducing sulfur slippage in an absorption process for removal of hydrogen sulfide from a fluid stream having a contaminating concentration of hydrogen sulfide is provided. The first step of this preferred embodiment includes adding by any suitable means the compound molybdenum disulfide to a contact material comprising zinc oxide and silica to thereby produce an absorbent suitable for use in said absorption process. The resultant absorbent material is thereafter contacted with a fluid stream having a contaminating concentration of hydrogen sulfide under conditions suitable for removing at least a portion of the contaminating concentration of hydrogen sulfide.

The process according to this invention can suitably process any type of fluid streams containing contaminating concentrations of sulfur compounds. Such sulfur compounds can include, for example, hydrogen sulfide, carbonyl sulfide, carbon dioxide, carbon disulfide, and mercaptans. Any suitable fluid containing contaminating concentrations of sulfur compounds can be processed in this invention. Suitable fluids can include, for example, natural gas, synthesis gas, hydrocarbons, and tail gas from Claus reaction processes. It is preferred that a hydrocarbon fluid stream containing a concentration of hydrogen sulfide be utilized in this invention. Generally, the concentration of the hydrogen sulfide in such a fluid stream will range upwardly to about 60,000 parts per million by volume (ppmv). The term "parts per million by volume" as used herein is defined as being 1 part by volume per 1 million parts by volume of the reference fluid stream. Preferably, the concentration of the hydrogen sulfide will range from 5,000 ppmv to 40,000 ppmv and, most preferably, the concentration of the hydrogen sulfide will range from 5,000 ppmv to 20,000 ppmv.

The sulfur contaminated fluid stream can be contacted by any suitable contacting means with the absorbent resulting from the addition of molybdenum disulfide under conditions that are suitable for removing at least a portion of the contaminating concentration of sulfur compounds in the fluid stream. The operating conditions under which the contacting step is conducted can be any suitable temperature, pressure or space velocity which will provide the desired sulfur removal. The operating temperature or contact temperature will generally be in the range of from about 300° F. to about 1100° F. and will more preferably be in the range of from about 400° F. to about 840° F. Such suitable operating pressure shall range from about atmospheric to about 2000 psia.

Any suitable space velocity for the sulfur compound containing fluid stream in the presence of the absorption composition of the present invention can be utilized. The space velocity is expressed as volumes of fluid at standard temperature and pressure per volume of absorbing composition per hour will generally be in the range of from about 10 to about 10,000 and will more preferably be in the range of from 250 to 2500.

As an additional optional step in the method for reducing sulfur slippage is that of calcining the absorbent, which is produced by adding molybdenum disulfide to the contact material comprising zinc oxide and silica, prior to the contacting step. The calcination of the absorbent composition is preferably conducted in the presence of an oxygen-containing gas such as, for example, air, at a temperature in the range of from about 700° F. to about 1400° F. for a period of time in the range of from 0.5 hour to about 4 hours.

The amount of molybdenum disulfide which is added to the contact material comprising the zinc oxide and silica can range upwardly to about 25 weight percent or, in the alternative, from at least a portion to about 25 weight percent; and, preferably, the amount of molybdenum disulfide added will range from about 1 to about 15 weight percent. Most preferably, the amount of molybdenum disulfide added will range from about 2 to about 10 weight percent. The amount of the silica component of the contact material comprising zinc oxide and silica can range from effective quantities up to about 90 weight percent, preferably from about 30 to about 90 weight percent, and, most preferably from about 35 to about 65 weight percent.

In another embodiment of the invention, a method is provided for reducing sulfur slippage in a process for absorbing hydrogen sulfide from a hydrogen sulfide contaminated fluid stream. This method of reducing sulfur slippage is performed by contacting the fluid stream containing a contaminating concentration of hydrogen sulfide by any suitable contacting means with a contact material comprising a mixture of zinc oxide, silica, and molybdenum disulfide, which has been previously calcined, to produce an effluent stream having a reduced concentration of said contaminating concentration of hydrogen sulfide.

The resultant effluent stream produced by the method described herein will generally have a reduced concentration of contaminating hydrogen sulfide and of sulfur dioxide that passes through the absorption material unabsorbed. While some of the sulfur dioxide present in the effluent stream can be sulfur dioxide that was present in the fluid stream being contacted with the absorption composition, much of the sulfur dioxide present in the effluent stream can be the result of sulfur slippage. The term "sulfur slippage" as used herein is defined as that amount of hydrogen sulfide, which is present in the fluid stream being contacted with the absorption composition, that is converted into sulfur dioxide by the result of a reaction with active ingredients contained within time absorption composition and that passes unabsorbed along with the effluent stream from the contacting means. It is most desirable to have the amount of sulfur slippage minimized while simultaneously maximizing the amount of sulfur absorption upon the absorbent material. The novel composition and method described herein provides the beneficial result of minimizing the amount of sulfur slippage. Generally, sulfur slippage will be less than 1000 ppmv; however, it is most preferable to have a sulfur slippage of less than 500 ppmv and, most preferably, the sulfur slippage should be less than 100 ppmv.

To provide further improvements in the method for reducing sulfur slippage in a process for absorbing hydrogen sulfide, or for removal of hydrogen sulfide from a fluid stream having a contaminating concentration of hydrogen sulfide, hydrogen can be provided or added to the fluid stream containing such contaminating concentration of hydrogen sulfide prior to or during the contacting of the fluid stream with the contact material, which has been previously calcined, comprising a mixture of zinc oxide, silica, and molybdenum disulfide. By adding or providing hydrogen to the fluid stream to be contacted with the absorbent material, significant and unexpected reductions in the amount of sulfur slippage are achieved. It is theorized that certain active compounds within the contact material react with a certain quantity of the hydrogen sulfide in the hydrogen sulfide contaminated fluid stream to form sulfur dioxide. The sulfur dioxide formed within the fluid stream then passes from the contacting means. It is believed that a presence of hydrogen in the fluid stream can be effective for the reduction of at least a portion of the sulfur dioxide formed or contained in the fluid stream to hydrogen sulfide. Any concentration of hydrogen in the fluid stream that effective in reducing sulfur slippage can be utilized in this method. Preferably, the amount of hydrogen to be added to the fluid stream can range from about 0.1 to shout 1.9 volume percent of the fluid stream.

The following examples are presented in further illustration of the invention.

EXAMPLE I

The following example illustrates the benefits that are derived from mixing molybdenum disulfide with the absorption components during the manufacture of the absorbent composition. Such benefits include, for example, improved lubricating properties of the mixture with the corresponding reduction in the coefficient of friction and the reduction in extruder die wear during the production of the absorbent composition agglomerate.

A number of extrusion aides and lubricants were evaluated to determine whether they could substantially reduce equipment wear during production of various absorption compositions. The evaluation was done by extruding equal quantities of material through soft metal dies of copper and aluminum in a 1-inch laboratory Bonnot extruder. After the extrusion, the weight loss from the dies was measured with the effectiveness of the additives being determined by comparing the weight loss from the extrusion dies caused by the various comparative compositions. The resulting data is reported in Table I.

Composition A is a mixture of zinc oxide and alumina with the amount of zinc oxide representing half the weight of the composition and the amount of alumina representing the remaining half of the weight of the composition. Composition B is a mixture of 50 weight percent zinc oxide, 40 weight percent silica, and 10 weight percent alumina. The absorbent compositions were prepared by mixing the components with an acetic acid solution to form an extrudable paste and thereafter extruding the paste through the dies of a 1-inch laboratory Bonnot extruder. As shown in Table I, no lubricant was mixed with composition A; and, for comparison, composition B had no lubricant mixed therein. Further provided in Table I, are compositions B1, B2, B3, B4 and B5 which are compositions of which the indicated lubricant is mixed with the composition B prior to the extrusion of the extrudable paste through the indicated dies. The weight loss resulting from extruding a fixed quantity of the indicated composition for each of the metal dies is presented in Table I. As indicated, the extrusion of composition A caused insignificant weight loss of the metal dies. However, composition B and the associated compositions all showed significant die wear which resulted from the extrusion of the compositions. The experimental lubricants provided varied results with graphite having very little effect upon die weight loss and with the lubricants stearic acid and STP showing increases in the amount of die weight loss. Molybdenum disulfide, however, was the only lubricant which indicated substantial reductions in the amount of die wear with such reduction being as much as 50% when compared with composition B which had no lubricant.

The data presented in Table I suggest that molybdenum disulfide, when used as a lubricant, can significantly reduce the die wear caused by the abrasive nature of the silica contained within composition B.

TABLE I

| | | | Die Plate Wear During Extrusion (1) | |
|---|---|---|---|---|
| Ab- | | Lubricant | Weight Loss (gm) from die | |
| sorbent | Lubricant | Loading (%) | Copper (2) | Aluminum (3) |
| A | None | 0 | 0.00 | 0.00 |
| | | 0 | 0.00 | 0.00 |
| B | None | 0 | 0.26 | 0.09 |
| B1 | Graphite | 1 | 0.24 | 0.14 |
| | | 1 | 0.24 | 0.12 |
| | | 1 | — | 0.11 |
| B2 | MoS2 | 5 | 0.15 | — |
| | | 10 | 0.15 | 0.07 |
| | | 10 | — | 0.04 |
| B3 | Stearic Acid | 1 | 0.40 | — |
| | | 2 | 0.36 | — |
| B4 | STP | 1 | 0.33 | — |
| B5 | Aquabind 5580 (4) | 1 | — | 0.18 |
| | | 1 | — | 0.09 |

Notes:
(1) Each extrusion consisted of 1100 g of solids through the 1" laboratory Bonnot single screw extruder. The total extrusion time depended on the material, but was typically between 20 and 30 minutes.
(2) The copper die used was a ⅜" thick copper die with 4 holes (⅛" diameter) in a circular pattern.
(3) The aluminum dies were ¼" thick grade T651 6061 T6 aluminum with four ⅛" diameter holes.
(4) Aquabind 5580 from Shamrock Technologies is an extrusion aide and lubricant. It is a blend of a cellulose and a wax.

EXAMPLE II

This example illustrates the use of the novel absorbent composition which utilizes a molybdenum promoter which source was from the molybdenum disulfide utilized as a lubricant as described in Example II. This example not only shows that the molybdenum disulfide can be used as a lubricant in the manufacture of the novel composition, but it can also be used as a suitable promoter for improving sulfur absorption and sulfur slippage in the absorption process. This example further illustrates the benefits which are achievable by adding a small concentration of hydrogen to an absorption zone feed fluid containing a concentration of hydrogen sulfide.

Illustrated in FIG. 1A, FIG. 1B and FIG. 1C and FIG. 2A, FIG. 2B and FIG. 2C are the results of experimental testing of absorbent compositions which contain a concentration of molybdenum. Further shown in FIG. 1A, FIG. 1B and FIG. 1C and FIG. 2A, FIG. 2B and FIG. 2C are the effects of utilizing hydrogen in the process feed fluid. The amount of hydrogen added to the process feed was about one volume percent of the fluid stream.

Figure 1B:
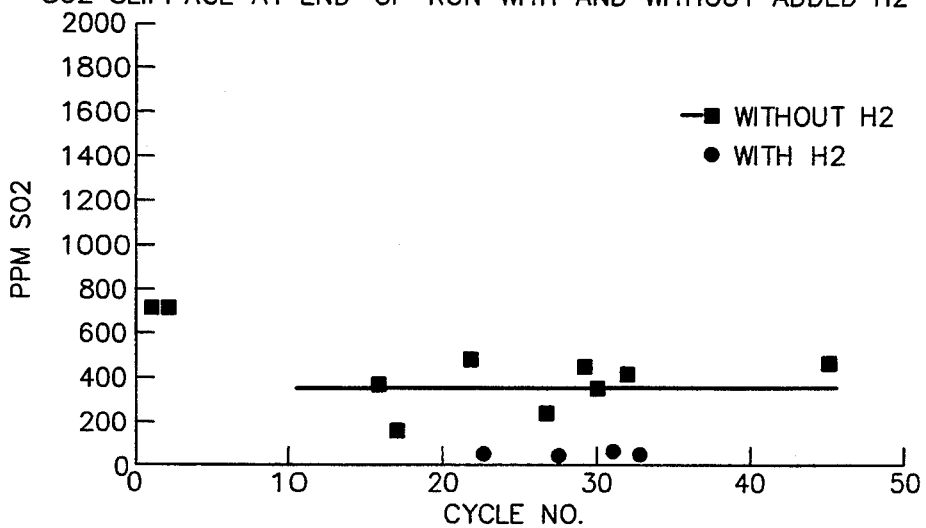
Figure 1C:
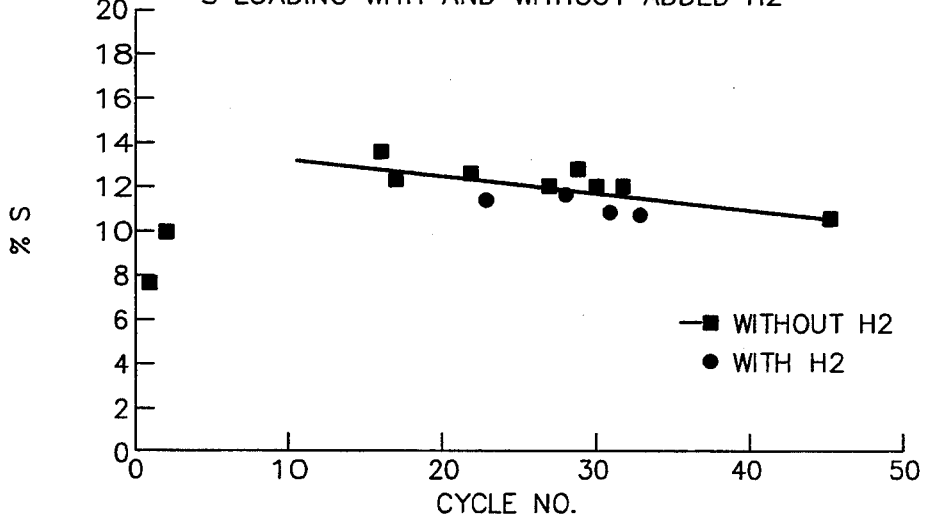

In FIG. 1A, FIG. 1B and FIG. 1C, the process and physical property data of the absorbing composition A, which was described in Example I but additionally having a six (6) weight percent molybdenum promoter metal, is presented in the form of graphs with the number of regeneration cycles being illustrated on the x-axis and the pertinent process and physical property data being represented on the y-axis. FIG. 1A, FIG. 1B and FIG. 1C illustrates the measured properties of the comparative absorbent composition A as described in Example I but additionally having a promoter metal. As shown, the sulfur loading capacity ranged from approximately 14 weight percent sulfur with a decreasing ability to absorb sulfur as the number of regenerations of the absorbent increased. Additionally, there seems to be little benefit to the sulfur loading capacity of the composition from adding hydrogen to the feed fluid stream. As for the sulfur slippage, at 10 minutes within a cycle, the amount of sulfur slippage is in the range of from about 1000 ppmv to about 800 ppmv. The presence of hydrogen in the process fluid stream early in the cycle has little affect upon the sulfur slippage by only reducing it about 10% to 20%. However, the sulfur slippage at the end of the run ranges from about 400 ppmv to about 300 ppmv, and when hydrogen is present in the feed fluid stream, the amount of sulfur slippage is reduced by as much as 90% to about 36 ppmv. These data illustrate that composition A, having a concentration of molybdenum, has both the desirable property of high sulfur loading capacity and the ability to absorb reduced sulfur compounds from process fluid streams with a minimum amount of sulfur slippage. Furthermore, the data illustrated in FIG. 1A, FIG. 1B and FIG. 1C shows the benefit from adding a small concentration of hydrogen to a process fluid stream undergoing an absorption step.

Figure 2A:
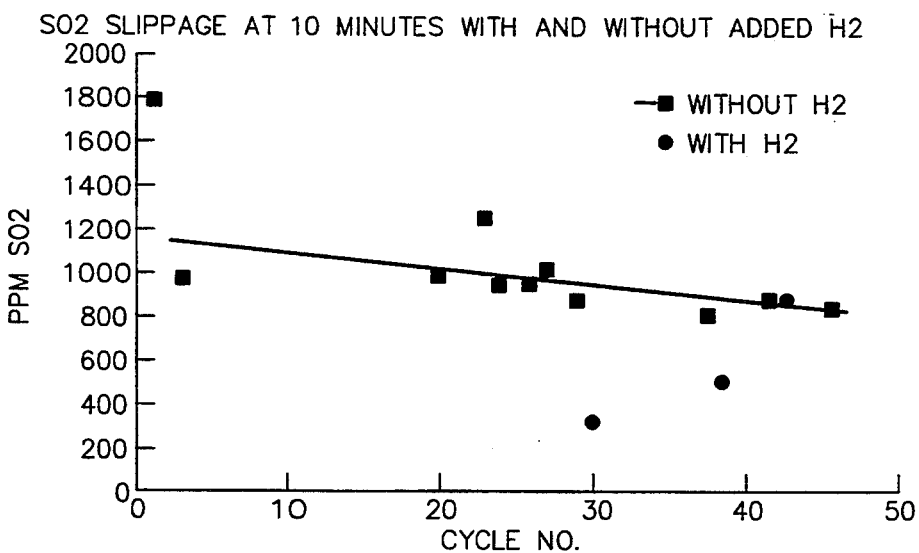
FIG. 2A–2C is a series of graphical representations of process and physical property data of the novel absorbent composition and the use thereof.
Figure 2B:
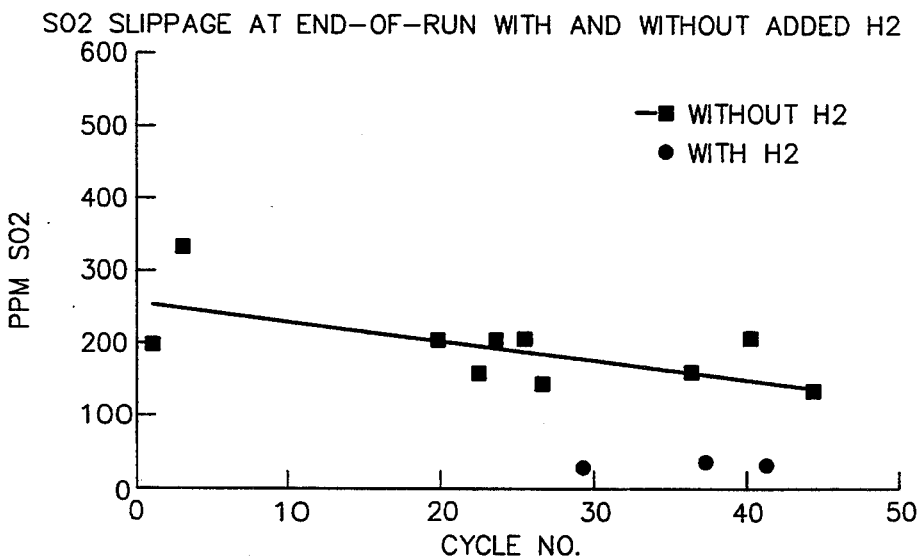
Figure 2C:
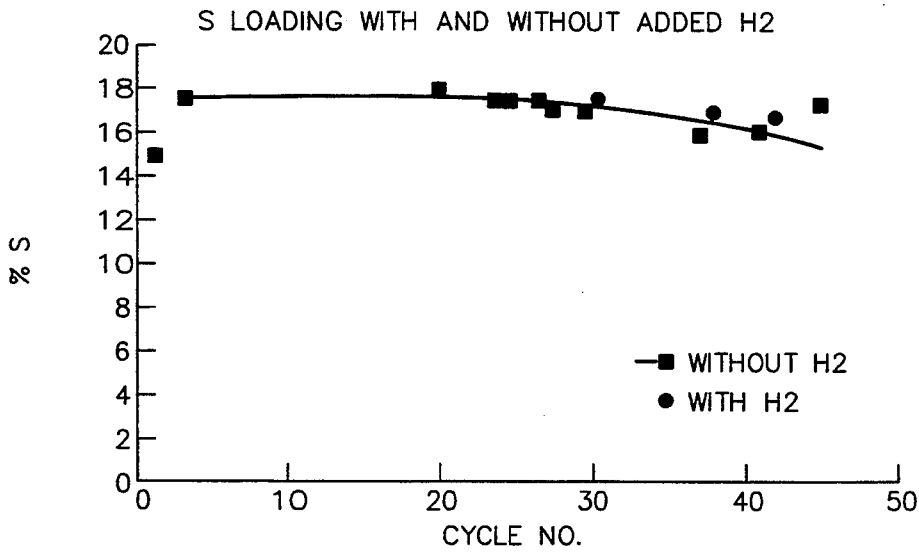

In FIG. 2A, FIG. 2B and FIG. 2C the process and physical property data of the absorbing composition B, which was described in Example I but additionally having a six (6) weight percent molybdenum metal promoter, is presented in the form of graphs with the number of regeneration cycles being illustrated on the x-axis and the pertinent process and physical property data being represented on the y-axis. As is shown in FIG. 2A, FIG. 2B and FIG. 2C, the sulfur loading capacity ranged from approximately 17.5 weight percent with a slight decrease in its ability to absorb sulfur as the number of regenerations increased. Additionally, there appears to be little benefit to the sulfur loading capacity of the composition from adding hydrogen to the feed fluid stream. As for the sulfur slippage, at 10 minutes within a cycle, the amount of sulfur slippage ranges from about 500 ppmv to about 350 ppmv. The presence of hydrogen in the process fluid stream results in significantly reducing the amount of sulfur slippage by as much as about 500 percent from about 125 ppmv to about 25 ppmv at end-of-run conditions and by as much as about 400 percent from about 400 ppmv to about 100 ppmv at 10 minutes into a cycle.

The data presented in FIG. 1A, FIG. 1B and FIG. 1C and FIG. 2A, FIG. 2B and FIG. 2C show the process improvements that are achievable by utilizing the novel aspects of the invention described herein. The composition used in generating the data presented in FIG. 2A, FIG. 2B and FIG. 2C shows superior and unexpected improvements in the absorption process. First, the sulfur loading capacity of composition B with six (6) percent molybdenum promoter is significantly greater than that of composition A with six (6) percent molybdenum. For instance, as can clearly be seen from the FIGURES, the sulfur loading capacity of the composition of FIG. 1A, FIG. 1B and FIG. 1C is in the range of from about 14 to about 10 weight percent; on the other hand, the sulfur loading capacity of the composition of FIG. 2A, FIG. 2B and FIG. 2C is significantly greater than that of FIG. 1A, FIG. 1B and FIG. 1C with it being in the range of from about 18 to about 17 weight percent. Second, the sulfur slippage for composition B with six (6) percent molybdenum promoter is significantly less than that for composition A with six (6) percent molybdenum. Sulfur slippage at 10 minutes into a cycle for the composition of FIG. 1A, FIG. 1B and FIG. 1C is in the range of from about 1000 ppmv to about 800 ppmv whereas the sulfur slippage at 10 minutes into a cycle for the composition of FIG. 2A, FIG. 2B and FIG. 2C is in the range of from about 525 ppmv to about 325 ppmv. And, for end-of-run conditions, sulfur slippage for the composition of FIG. 1A, FIG. 1B and FIG. 1C is in the range of from about 575 ppmv and about 300 ppmv whereas the sulfur slippage for the composition of FIG. 2A, FIG. 2B and FIG. 2C is in the range of from about 250 ppmv to about 125 ppmv.

When a thorough comparison is made between the data as presented in FIG. 1A, FIG. 1B and FIG. 1C and FIG. 2A, FIG. 2B and FIG. 2C, it is clear that superior results are obtainable by using the composition of FIG. 2A, FIG. 2B and FIG. 2C in an absorption process. By utilizing the composition of FIG. 2A, FIG. 2B and FIG. 2C, improvements both in sulfur loading capacity and sulfur slippage are obtained giving a sulfur loading capacity that is significantly higher than that of the composition of FIG. 1A, FIG. 1B and FIG. 1C and giving a sulfur slippage significantly lower than that of the composition of FIG. 1A, FIG. 1B and FIG. 1C. Additionally, by adding one (1) volume percent hydrogen to the process feed fluid, sulfur slippage can be reduced by as much as about 500 percent under sulfur slippage that can occur when no hydrogen is added to a process feed fluid.

The inventive composition as described herein provides for an improved absorption composition which has a high sulfur absorption capacity and, when utilized in an absorption process, provides minimum sulfur slippage. Furthermore, the date presented herein illustrate that the inventive composition can undergo many regeneration cycles and still maintain the desirable physical properties of high sulfur loading capacity and the provision of low sulfur slippage. Additionally, the novel absorbent manufacturing method described herein can significantly reduce the amount of extrusion equipment wear in the manufacture of the novel composition. Moreover, when the inventive composition is used in an absorption process and small quantities of hydrogen are added to the process feed fluid stream, further reduction in sulfur slippage is observed thereby improving the sulfur absorption process.

Reasonable variations and modifications are possible within the scope of this disclosure without departing from the scope and spirit thereof.

That which is claimed is:

1. A method of reducing sulfur slippage in an absorption process for removal of hydrogen sulfide from a fluid stream having a contaminating concentration of hydrogen sulfide of upwardly to about 60,000 ppmv, comprising the steps of:

adding molybdenum disulfide to a contact material comprising zinc oxide and silica to thereby produce an absorbent suitable for use in said absorption process; and contacting said fluid stream with said absorbent under conditions suitable for removing at least a portion of said contaminating concentration of hydrogen sulfide so as to give said contaminating concentration of hydrogen sulfide of less than 500 ppmv.

2. A method as recited in claim 1 wherein the silica contained in said contact material is present in the range of from about 30 to about 90 parts by weight per 100 parts by weight of the sum weight of said absorbent.

3. A method as recited in claim 2 wherein the amount of molybdenum disulfide added to said contact material is in the range of from about 1 to about 15 parts by weight per 100 parts by weight of the sum weight of said absorbent.

4. A method as recited in claim 3 further comprising the step of:

calcining said absorbent, prior to said contacting step, in the presence of an oxygen-containing gas at a temperature in the range of from about 700° F. to about 1400° F. for a period of time of from about 0.5 hour to about 4 hours.

5. A method as recited in claim 4 wherein the conditions for conducting said contacting step comprise a temperature in the range of from about 300° F. to about 1100° F., a pressure in the range of from about atmospheric to 2000 psia, and an hourly space velocity in the range of from about 250 to about 2500.

6. A method as recited in claim 5 further comprising the step of:

providing hydrogen to said fluid stream prior to said contacting step in an amount whereby sulfur slippage is reduced to the range of from about 0.1 to about 1.9 volume percent of said fluid stream.

7. A method of reducing sulfur slippage in a process for absorbing hydrogen sulfide comprising the step of:

contacting a fluid stream containing a contaminating concentration of hydrogen sulfide of upwardly to about 60,000 ppmv with a contact material comprising a mixture of zinc oxide, silica, and molybdenum disulfide, which has been calcined, to produce an effluent stream having a reduced concentration of said contaminating concentration of hydrogen sulfide and having a minimum concentration level of sulfur dioxide.

8. A method as recited in claim 7 wherein said mixture contains molybdenum disulfide in an amount up to about 25 parts by weight molybdenum disulfide per 100 parts by weight of the sum weight of zinc oxide, silica, and molybdenum disulfide.

9. A method as recited in claim 8 wherein said mixture contains silica in the range of from about 30 to about 90 parts by weight per 100 parts by weight of the sum weight of zinc oxide, silica, and molybdenum disulfide.

10. A method as recited in claim 9 where in the conditions for conducting said contacting step comprise a temperature in the range of from about 300° F. to about 1100° F., a pressure in the range of from atmospheric to 2000 psia, and an hourly space velocity in the range of from about 250 to about 2500.

11. A method as recited in claim 10 further comprising:

adding to said fluid stream prior to said contacting step hydrogen in an amount suitable for the reduction of a portion of the sulfur dioxide contained in said fluid stream to hydrogen sulfide.

12. A method as recited in claim 11 wherein the amount of hydrogen added to said fluid stream is in the range of from about 0.1 to about 1.9 volume percent of said fluid stream.

13. A method as recited in claim 12 wherein the concentration of hydrogen sulfide in said effluent stream approaches zero and said minimum concentration level of sulfur dioxide: is less than 1000 ppmv.

* * * * *